S. Bradbury. Combined Roller, Harrow and Drill.

N° 93956

PATENTED AUG 24 1869

Witnesses:
A. W. Almqvist
Geo. W. Mabee

Inventor:
S. Bradbury
per Munn & Co.
Attorneys.

United States Patent Office.

SAMUEL BRADBURY, OF DRESDEN, MISSOURI.

Letters Patent No. 93,956, dated August 24, 1869.

IMPROVEMENT IN COMBINED HARROW, ROLLER, AND DRILL.

The Schedule referred to in these Letters Patent and making part of the same.

*To all whom it may concern:*

Be it known that I, SAMUEL BRADBURY, of Dresden, in the county of Pettis, and State of Missouri, have invented a new and useful Improvement in Combined Roller, Harrow, and Drill; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved combined harrow, roller, and drill, which shall be so constructed and arranged that the roller may be used alone, or the roller and harrow, or the roller and drill, or the roller, harrow, and drill, as the circumstances of the case may render advisable, doing its work well in either capacity; and It consists in the construction and combination of the various parts of the machine, as hereinafter more fully described.

A is the frame of the machine, to the forward part of which the tongue B is attached, and to the under side of the middle parts of the side-bars of which, are attached brackets or standards C, in bearings in the lower ends of which the axle D, of the roller E F, revolves, so that the said frame may ride upon and be supported by the said axle of the said rollers.

The roller is made in two parts, E F, the part E of which, is securely attached to the axle D, so as to carry the said axle with it in its revolution.

The part F, of the roller, revolves loosely upon the axle D, in such a way that it may be moved longitudinally upon said axle.

Figure 1:
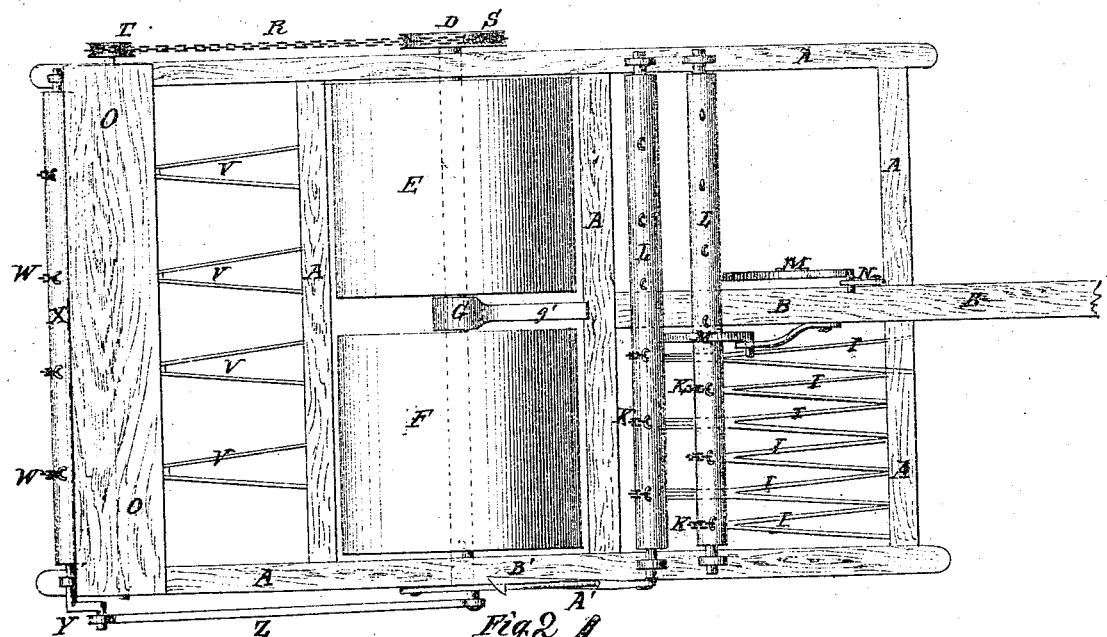
Figure 1 is a top view of my improved machine, the seat and part of the harrow-teeth being removed.

The roller E F is made about ten inches shorter than the space between the side-timbers of the frame A, so that when the machine is used for harrowing or drilling, the part F, of the roller, may be moved close up to the part E, and so that when the machine is used for cultivating corn, the parts of the roller may be moved apart, as shown in fig. 1, to allow the row of plants to pass between the parts of the roller.

The part F, of the roller, is kept in either position by the open collar G, which is dropped upon the axle D at one or the other end of the part F, and which is made with a handle, $g'$, of such a length as to rest against a cross-bar of the frame A, and thus prevent the said open collar from dropping or working off the axle D.

The handle $g'$ is also convenient for attaching and detaching the collar when required.

H are the harrow-teeth, which are made with a curve so as to stir the ground with a lifting movement.

The upper ends of the teeth H are pivoted to the rear ends of the beams or draught-bars I, and are kept from being forced too far back by shoulders or heads, $h'$, formed upon their upper ends.

The forward parts of the draught-bars or beams I are branched, as shown in fig. 1, and their forward ends are pivoted to a cross-rod, J, attached to the forward part of the frame A.

Figure 2:
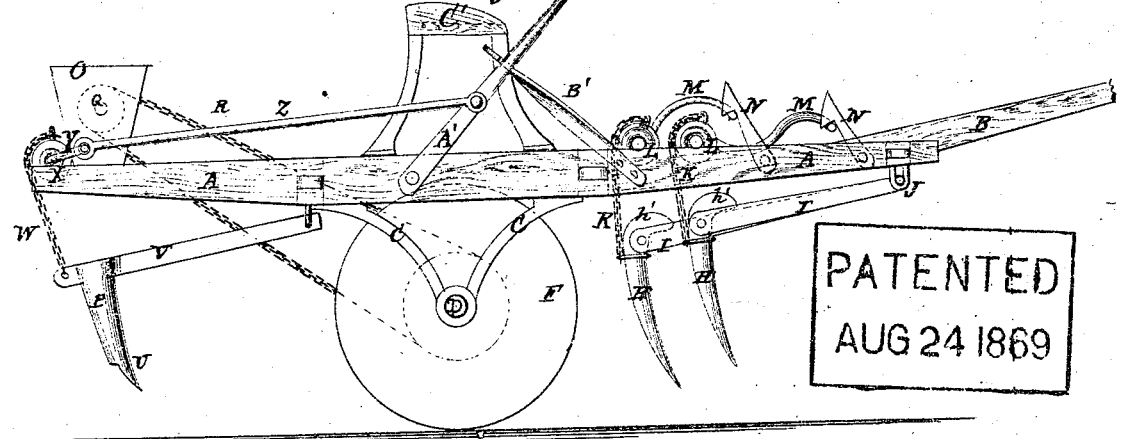
Figure 2 is a side view of the same.
Figure 3:
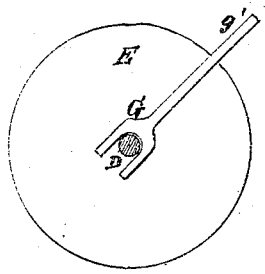
Figure 3 is a detail view of the detachable collar.

The draught-bars or beams are made longer and shorter, alternately, as shown in figs. 1 and 2, so that the harrow-teeth may be arranged in two rows.

K are chains, the lower ends of which are attached to the upper parts of the teeth H, and the upper ends of which are attached to the rollers L, the chains from the forward teeth being connected with the forward roller, and the chains of the rear teeth being connected with the rear roller.

The journals of the rollers L work in bearings attached to the frame A, and to each of said rollers L, is attached a lever, M, by means of which the rollers L may be turned to wind up the chains K, and thus raise the teeth H away from the ground.

The levers M, when moved into position to raise the teeth H away from the ground, are caught and held by catches, N attached to the frame A, or tongue B, so as to hold the said harrow-teeth away from the ground as long as may be required.

O is a seed-box or hopper, attached to the rear part of the frame A, and from which the seed is conveyed to the conductor-spouts, (not shown in the drawings,) by which it is conducted to the hollow or tubular standards, P, by the dropping-cylinder Q, which revolves in bearings in the ends of the box O, and which is driven by the chain or band R, which passes around a pulley, S, attached to the end of the roller-shaft D, and around a pulley, T, attached to the end of the dropping-cylinder Q.

Upon the lower ends of the tubular standards P, are formed, or to them are attached points U, to open the ground to receive the seed.

The draught-strain upon the standards P, is sustained by the draught-bars or beams V, to the rear ends of which the upper ends of the said standards P are securely attached.

The forward parts of the draught-bars or beams V, are branched, and their forward ends are pivoted to a cross-bar of the frame A.

W are chains, the lower ends of which are attached to the upper parts of the tubular standards P, or to the rear ends of the draught-bars V, and their upper ends are attached to the roller X, which revolves in bearings attached to the rear part of the frame A.

To one end of the roller X is attached a crank, Y, to the crank-pin of which is pivoted the rear end of the connecting-bar Z, the forward end of which is pivoted to the lever A'.

The lower end of the lever A' is pivoted to the frame A, and its upper end extends up into such a position that it may be conveniently reached and operated by the driver from his seat, to raise the tubular standards P away from the ground when desired.

B' is a catch, attached to the frame A in such a position as to take hold of the lever A', when moved into position to hold the standard P suspended.

C' is the driver's seat, which rests upon the frame A, so that it may be moved back and forth, as desired, to balance the machine more exactly.

Having thus described my invention,

I claim as new, and desire to secure by Letters Patent—

1. The harrow-teeth H and draught-bars I, in combination with the roller E F and frame A, substantially as herein shown and described, and for the purpose set forth.

2. The combination of the chains K, rollers L, levers M, and catches N, with the harrow H I and frame A, substantially as herein shown and described, and for the purpose set forth.

3. The combination of the harrow H I, rollers E F, and drilling-device O P V, with each other, and with the frame A, substantially as herein shown and described, and for the purposes set forth.

4. The adjustable roller D E F, constructed and operating substantially as herein shown and described, and for the purpose set forth.

5. The combination of the chains W, rollers X, crank Y, connecting-rod Z, lever A', and catch B', with the drilling-standards P, draught-bars V, and frame A, substantially in the manner herein shown and described, and for the purpose set forth.

SAMUEL BRADBURY.

Witnesses:
WM. M. SHRIVER,
JAMES H. COOK.